United States Patent [19]
Gartner et al.

[11] Patent Number: 5,180,430
[45] Date of Patent: Jan. 19, 1993

[54] CONCRETE SURFACE AIR VOID REDUCTION ADMIXTURE

[75] Inventors: Ellis M. Gartner, Silver Spring; Chiara F. Ferraris, Columbia, both of Md.

[73] Assignee: W.R. Grace & Co.-Conn., New York, N.Y.

[21] Appl. No.: 777,854

[22] Filed: Oct. 16, 1991

[51] Int. Cl.$^5$ .............................................. C04B 24/10
[52] U.S. Cl. .................................. 106/730; 106/804; 106/823
[58] Field of Search .............. 106/729, 730, 804, 823; 264/333

[56] References Cited

U.S. PATENT DOCUMENTS

| | | | |
|---|---|---|---|
| 4,963,668 | 6/1990 | Allen et al. | 536/114 |
| 5,004,506 | 4/1991 | Allen et al. | 106/729 |

Primary Examiner—Karl Group
Assistant Examiner—Anthony J. Green
Attorney, Agent, or Firm—Howard J. Troffkin

[57] ABSTRACT

A method of reducing the surface voids and imperfections of molded cement structures by forming the cement composition with an admixture comprising a combination of Welan Gum and a water reducing agent.

4 Claims, No Drawings

CONCRETE SURFACE AIR VOID REDUCTION ADMIXTURE

The present invention is directed to a method of forming concrete formations which are substantially free of large surface voids and defects commonly found in cast concrete structures.

Many concrete structural units (The term "structural unit", as used herein and in the appended claims, shall mean individually molded units, such as columns, beams, etc. and not a complete assembly of such items with other non-concrete items which form a complete structure or building) are precast, prestressed formations made at location away from the construction site. This is done to provide uniform and high quality concrete formations which are difficult to form in the field. The precast formations are delivered to the job site and installed as part of the structure being formed. Such structural units include, for example, beams, columns, exterior panels, floor sections and the like.

The formation of such precast structural units conventionally requires the use of forms which contact a major portion of the unit's concrete surface as it is being cast and cured. In addition, job-site formation of concrete columns and the like present a similar situation, having the structural unit prepared by casting the concrete into forms or molds which contact a major portion of the unit's concrete surface during formation.

During the mixing of the components used to form hydraulic cement compositions, such as mortars (sand, cement, water) and concrete (small aggregate such as sand, large aggregate such as gravel, hydraulic cement such as portland cement and water), air is entrapped in the composition. In certain instances, known cement additives are incorporated into the composition to enhance one or more of its properties. However, some cement additives are known to also cause additional entrapment of air in the composition.

Although small amounts of air voids are useful in concrete structures and structural units (enhances its free-thaw characteristics), they should be made up of small voids which are uniformly distributed within the structure. Thus, during the casting of an unset concrete composition into a mold, the composition and/or the mold are vibrated in attempts to cause the solids to settle and push out excess air and to cause uniform distribution of the remaining air in the cast unit.

It is well known that air which is trapped between the unset concrete mass and the mold surface tends to agglomerate into large pockets or voids which are difficult to remove during casting. These large voids detract from the appearance and tends to reduce the strength of the surface portion of the resultant cast structural unit. Such voids are commonly called "bugholes" in the industry.

It is desired to have a means of reducing the formation of bugholes and provide structural units having a smoother surface appearance. This result must be achieved without altering the slump and setting rate of the concrete being cast.

SUMMARY OF THE INVENTION

The present invention provides a means of forming cast concrete structural units which are substantially free of large voids on the unit's surfaces which were adjacent to the casting form or mold. The process comprises forming a concrete composition containing an admixture composed of a water-reducing agent and Welan Gum, casting said composition into a mold or form and subsequent to set, retrieving the cast concrete structural unit.

DETAILED DESCRIPTION

The present invention is directed to a method of forming cast concrete structural units having surfaces which are substantially free of large voids and the like, commonly known as bugholes.

The subject structural units are formed from a hydraulic cement compositions, more particularly, hydraulic concrete compositions. Such compositions are formed from a hydraulic cement, such as Portland cement, aggregate of varying particle size, including small aggregate, such as sand and large aggregate such as pea gravel and larger gravel. This composition, when mixed with small amounts of water (usually 0.25–0.8 part, preferably 0.3–0.6 parts water per unit of cement), forms a hard, rock-like structure. The proportions of the components are commonly known to the artisan and are in ACI Manual of Concrete Practice, ACI, 1987. For example, structural formations of increased compressive strength can be formed by increasing the hydraulic cement content in a concrete formulation. [Normally from 4 to 6 bags (94 lbs each) of cement is used per cubic yard of concrete composition]. The strength can also be varied by altering the water to cement ratio. However, reduction of water content causes decreased slump to the unset material. The amount of air content can be reduced by adjusting the particle size distribution of the aggregate.

A concrete structural unit is formed by initially forming a composition of cement, aggregate and water into a substantially uniform mixture. The composition may contain other materials such as set accelerators (sodium chloride, calcium nitrite, etc.); strength enhancers (fumed silica); set retarders (sugars, sugar acids, etc.); pigments and the like.

The present invention requires the composition to contain a combination of a water-reducing agent and Welan Gum. It has unexpectedly been found that when forming a cast concrete structure in molds or forms which provide a high degree of surface constriction, the large surface voids are substantially reduced or eliminated when the present invention is employed. This is especially preferred when it is desired to rapidly fill molds or where the mold provides a major concrete-to-mold surface contact. For example, when concrete compositions are cast into a column or girder mold, only the top surface of the column or girder is exposed. The interfacial surfaces of the mold and the concrete normally provide a haven for large amounts of air. This air is hard to remove and, thereby, forms large surface voids on the resultant structural unit. However, it has been unexpectedly found that when a concrete composition contains a combination of water-reducing agent and Welan Gum, the initial unset material retains its slump properties but provides a concrete unit which is substantially free of bugholes.

The present composition must contain a low-level water-reducing agent such as lignin sulfonate, melamine sulfonate-formaldehyde or naphthalenesulfonate-formaldehyde condensates. The preferred water-reducing agent is naphthalenesulfonate-formaldehyde condensate. The amount of this agent to be used will depend on the slump desired for the casting composition. Amounts of from about 0.3 to 1.0 wt. percent, preferably from 0.4–0.6 wt. percent, based upon the weight of cement used is acceptable. The amount can be varied to achieve the desired slump of a particular concrete composition and can be determined by routine experimentation. Mere alterations in slump do not provide concrete which avoid the problem of bugholes.

The other component required is Welan Gum. Welan gum is fully described in U.S. Pat. No. 4,342,866, the teachings of this U.S. Patent are incorporated herein by reference. Welan gums have been used as a suspension aid and fluid loss controller in cement compositions used in oil field applications where cement slurries contain large amounts of water, as shown in U.S. Pat. Nos. 4,963,668 and 5,004,506. These references do not suggest the presently required combination nor a means of affecting surface characteristics of cement structural units.

The Welan Gum is a heteropolysaccharide prepared by aerobic formation of suitable aqueous nutrient media having sources of carbon, nitrogen and inorganic salts under controlled conditions by inoculation with Alcaligene organism ATCC 31555.

In general, carbohydrates (for example, glucose, fructose, maltose, sucrose, xylose, mannitol and the like) can be used either alone or in combination as sources of carbon in the nutrient medium. The exact quantity of the carbohydrate source usually varies between about 2% and 4% by weight of the medium. Preferably 3% glucose is used. In general, many proteinaceous materials may be used as nitrogen sources in the fermentation process. Suitable nitrogen sources include, for example, yeast hydrolysates, primary yeast, soybean meal, cottonseed flour, hydrolysates of casein, corn steep liquor, distiller's solubles or tomato paste and the like. The sources of nitrogen, either alone or in combination, are used in amounts ranging from about 0.05% to 0.4% by weight of the aqueous medium. Among the nutrient inorganic salts which is incorporated in the culture media are salts capable of yielding sodium, potassium, ammonium, calcium, phosphate, sulfate, chloride, carbonate, and the like ions. Also included are trace metals such as cobalt, manganese, iron and magnesium.

The fermentation is carried out at temperatures ranging from about 25° C. to 35° C.; preferably at temperatures of from about 28° C. to 32° C. The pH of the nutrient media can vary from about 6 to 8, preferably 6.5 to 7.5. The fermentation is conventionally carried out by inoculating a suitable nutrient medium with the culture, and, after transfer to a production medium, permitting the fermentation to proceed at a constant temperature of about 30° C. on a shaker for several days. The Welan Gum product is recovered from the fermentation medium by precipitation with a suitable alcohol, such as isopropanol. A low viscosity Welan Gum material can also be used. It is prepared by either treating the broth or the final product with hydrogen peroxide in the presence of ferrous sulfate and ethylenedinitrilo tetraacetate sodium salt. (3–5:1:2 wt. ratio)

Although each of the presently required materials, a water-reducing agent and a Welan Gum, have been previously applied to cement compositions, it is found that their combination unexpectedly provides the surface phenomenon of elimination of bugholes from cast concrete structures. The amount of Welan Gum required to produce this result is from 0.001 to 0.01 percent by weight based on the cement content of the composition.

The water-reducing agent and Welan Gum can each be added separately or can be precombined and then added to the concrete composition. Further, the combined agents can be added prior to, as part of or subsequent to the water of hydration used to form the castable concrete composition.

The casting, set and retrieval procedures of the shaped concrete structure are not affected by the inclusion of the presently required agents. It has been found that slump and set time are also not affected.

The following examples are given for illustrative purposes only and are not meant to be a limitation on the claims appended hereto. All parts are by weight unless otherwise indicated.

Two air entrained concrete mixes were prepared from 7.5 parts portland cement, 11.2 parts sand, 18.4 parts coarse aggregate, neutralized vinsol resin aqueous solution (Daravair-M) at the rate of 0.032 percent solid based on total solids, naphthalene sulfonate-formaldehyde water reducing agent as an aqueous solution (WRDA-19 of W. R. Grace & Co.) and 2.63 parts water (water/cement ratio of 0.35). Each mix was formed using a Lancaster pan-type mixer. To one mix was added 0.01 parts solid Welan Gum based on solid cement component of the mix. Additional water-reducing agent was added to attain a final slump of about 7.5 inches for each mix. The air content was above 5 percent for each mix.

Steel 6 inch cube molds were coated with a mold release oil (Crete Lease 880 of Cresset at 0.01 g/in$^2$). The concrete mixes were poured into the molds with constant rodding. Each mold was then vibrated for 60 seconds using a vibrating table. Each cube was then allowed to cure for 24 hours under a moist atmosphere.

Each cube specimen was examined on two faces which had been in contact with mold surfaces (one rough and one smooth). The bughole imperfections (surface voids greater than 1 mm diameter) were measured as a percentage of the total surface using an image analyzer linked to a video camera. Differences of 0.3% were statistically significant at 95% confidence level.

The bughole imperfections occupied an area of only 1.8 percent of the total surface of both the rough and smooth molded surfaces for samples formed with Welan Gum/water reducing agent combination. The sample contained 0.01% s/s (solid Welan Gum/solid of cement) and 0.75% s/s naphthalene sulfonate- formaldehyde water reducing agent to achieve a slump of 7.3 in.

In comparison, the bughole imperfections occupied an area of 2.9 percent of the total surface (more than 50% greater than the above sample) for both the smooth and rough surfaces of samples formed with only water reducing agent. These comparative samples required 0.45% s/s of water reducing agent to achieve a slump of 7.5 inches, substantially the same slump as the above sample. Samples having higher dosages of water reducing agent exhibits higher slump but substantially no reduction in bughole imperfections.

What is claimed:

1. A process for inhibiting formation of surface voids of concrete structural unit comprising
    mixing a concrete composition composed of hydraulic cement, small aggregate, large aggregate and water with a combination of a cement water-reducing agent and Welan gum and, based on the hydraulic cement of said concrete composition, said water-reducing agent being present in from about 0.3 to 1 weight percent and said Welan Gum being present in from about 0.001 to 0.01 weight percent;

casting said concrete composition into a mold capable of forming a shaped structure and having concrete-to-mold surface contact;

curing said concrete composition while contained within the mold; and removing the mold to retrieve a cured shaped concrete structural unit which is substantially free of large surface voids on surfaces in contact with the mold during casting and curing.

2. The process of claim 1 wherein the combined water-reducing agent and Welan gum are introduced as an aqueous mixture into the concrete composition.

3. The process of claim 1 wherein the water reducing agent is lignin sulfonate, melamine sulfonate-formaldehyde condensate or naphthalene sulfonate-formaldehyde condensate.

4. The process of claim 2 wherein the water reducing agent is lignin sulfonate, melamine sulfonate-formaldehyde or naphthalene sulfonate-formaldehyde.

* * * * *